(12) United States Patent
Zou et al.

(10) Patent No.: US 12,716,543 B2
(45) Date of Patent: Aug. 25, 2026

(54) MAGNETIC ADSORPTION TYPE SUPPORT

(71) Applicant: SHENZHEN VIJIM TECHNOLOGY CO., LTD, Shenzhen (CN)

(72) Inventors: Qingqing Zou, Shenzhen (CN); Suying Wang, Baoting Li and Miao Autonomous County (CN); Wei Tang, Changde (CN); Xueliang Li, Shenzhen (CN); Rongxun He, Hechi (CN)

(73) Assignee: SHENZHEN VIJIM TECHNOLOGY CO., LTD, Shenzhen (CN)

( * ) Notice: Subject to any disclaimer, the term of this patent is extended or adjusted under 35 U.S.C. 154(b) by 88 days.

(21) Appl. No.: 18/949,991

(22) Filed: Nov. 16, 2024

(65) Prior Publication Data

US 2025/0271096 A1 Aug. 28, 2025

(30) Foreign Application Priority Data

Feb. 28, 2024 (CN) ........................ 202420380281.7

(51) Int. Cl.
*F16M 11/04* (2006.01)
*F16M 11/38* (2006.01)

(52) U.S. Cl.
CPC ........... *F16M 11/041* (2013.01); *F16M 11/38* (2013.01)

(58) Field of Classification Search
CPC ............................. F16M 11/041; F16M 11/38
USPC .......................................................... 248/683
See application file for complete search history.

(56) References Cited

U.S. PATENT DOCUMENTS

| | | | | |
|---|---|---|---|---|
| 7,661,644 B1 * | 2/2010 | Yen | A47G 29/083 | 248/304 |
| 8,371,546 B2 * | 2/2013 | Bauerly | A47G 29/083 | 248/339 |
| 8,585,002 B2 * | 11/2013 | Ho | A47G 29/083 | 248/304 |
| 10,938,433 B2 * | 3/2021 | Yim | H04M 1/04 | |
| 12,506,507 B1 * | 12/2025 | Yang | H04B 1/3888 | |
| 2005/0161570 A1 * | 7/2005 | Bauerly | A47G 29/083 | 248/304 |
| 2015/0257288 A1 * | 9/2015 | Livernois | H04B 1/3877 | 248/346.06 |

FOREIGN PATENT DOCUMENTS

| | | |
|---|---|---|
| CN | 208967349 U | 6/2019 |
| CN | 209435285 U * | 9/2019 |

(Continued)

*Primary Examiner* — Anita M King
(74) *Attorney, Agent, or Firm* — Nitin Kaushik

(57) ABSTRACT

The present application relates to the field of supports for electronic devices, in particular to a magnetic adsorption type support. The magnetic adsorption type support includes a magnetic adsorption fixing portion and an overturning support portion, where the magnetic adsorption fixing portion is capable of being adsorbed on an electronic device; the overturning support portion is hinged to the magnetic adsorption fixing portion and is capable of being overturned towards or away from the magnetic adsorption fixing portion, and the overturning support portion cooperates with the magnetic adsorption fixing portion to support the electronic device when being overturned away from the magnetic adsorption fixing portion; and the magnetic adsorption fixing portion is of a ring structure capable of being opened and closed.

20 Claims, 10 Drawing Sheets

(56) References Cited

FOREIGN PATENT DOCUMENTS

| | | | | |
|---|---|---|---|---|
| CN | 215950841 | U | | 3/2022 |
| CN | 220647404 | U | | 3/2024 |
| CN | 222283294 | U | * | 12/2024 |
| CN | 223216032 | U | * | 8/2025 |

* cited by examiner

MAGNETIC ADSORPTION TYPE SUPPORT

CROSS-REFERENCE TO RELATED APPLICATIONS

The application claims priority to Chinese patent application No. 2024203802817, filed on Feb. 28, 2024, the entire contents of which are incorporated herein by reference.

TECHNICAL FIELD

The present application relates to the field of supports for electronic devices, in particular to a magnetic adsorption type support.

BACKGROUND

With the high-speed development of the mobile Internet industry, portable electronic devices such as mobile phones and tablet computers are not only applied to calling and messaging in daily life, but also become essential tools for leisure and entertainment.

If the mobile phones and the tablet computers in a movie-watching mode are held by hand for a long time, the feeling of fatigue of hands will be increased, which affect the movie-watching experience. Therefore, mobile phone supports emerge. Ordinary mobile phone supports are fixed by means of back bonding, which will interfere with wireless charging of the electronic devices, and also affect the holding experience of users in a non-movie-watching mode. Therefore, magnetic adsorption type supports begin to enter the support market gradually. When the electronic devices need to be supported in the movie-watching mode, the supports are adsorbed and fixed to the backs of the electronic devices by means of magnetic adsorption structures, and when the electronic devices do not need to be supported by the supports, the supports can be conveniently removed from the backs of the electronic devices.

However, after the magnetic adsorption type supports are removed from the backs of the electronic devices, the supports are inconvenient to carry and store and easy to lose, which brings certain inconvenience to the users.

SUMMARY

The present application provides a magnetic adsorption type support. The magnetic adsorption type support is small in size, can be reliably connected to an electronic device and stably support the electronic device, and can be worn and fixed when being separated from the electronic device, thereby effectively preventing losing.

In order to achieve the above technical effects, the present application provides a magnetic adsorption type support, comprising:

a magnetic adsorption fixing portion configured to be magnetically adsorbed on an electronic device; and an overturning support portion which is hinged to the magnetic adsorption fixing portion and is capable of being overturned towards or away from the magnetic adsorption fixing portion, where the overturning support portion cooperates with the magnetic adsorption fixing portion to support the electronic device when being overturned away from the magnetic adsorption fixing portion; and at least one of the magnetic adsorption fixing portion and the overturning support portion is of a ring structure capable of being opened and closed.

In some embodiments, the magnetic adsorption fixing portion is of the ring structure; and the magnetic adsorption fixing portion includes:

a first arc-shaped structure; and a second arc-shaped structure rotationally connected to the first arc-shaped structure, where the first arc-shaped structure and the second arc-shaped structure form the closed ring structure when being rotated to abut against each other; and at least one of the first arc-shaped structure and the second arc-shaped structure is capable of being magnetically adsorbed on the electronic device.

In some embodiments, the radian of the first arc-shaped structure is greater than $\pi$; and the first arc-shaped structure includes a first arc-shaped housing and a first magnet, and the first arc-shaped housing is provided with a first recess for accommodating and fixing the first magnet.

In some embodiments, the second arc-shaped structure includes a second arc-shaped housing and a second magnet, and the second arc-shaped housing is provided with a second recess for accommodating and fixing the second magnet.

In some embodiments, the first arc-shaped structure and the second arc-shaped structure are connected in a damped rotating manner, or a first elastic torsion member for driving the first arc-shaped structure and the second arc-shaped structure to rotationally abut against each other is disposed at a rotational connection position of the first arc-shaped structure and the second arc-shaped structure.

In some embodiments, the overturning support portion is a rod body convenient to hold, and one end of the rod body is hinged to the magnetic adsorption fixing portion.

In some embodiments, the overturning support portion is a three-legged support, and a top end of the three-legged support is hinged to the magnetic adsorption fixing portion.

In some embodiments, a connecting protrusion protrudes from one side of the magnetic adsorption fixing portion facing away from an adsorption side surface thereof, a rotating shaft hole is formed in the connecting protrusion, and the overturning support portion is provided with an overturning shaft adapted to the rotating shaft hole.

In some embodiments, the overturning support portion is of a ring structure capable of being opened and closed, and the magnetic adsorption fixing portion is overturned and folded on an inner storage circumference of the ring structure.

In some embodiments, the magnetic adsorption fixing portion is of the ring structure capable of being opened and closed, and the overturning support portion is overturned and folded on an inner accommodating circumference of the magnetic adsorption fixing portion.

In some embodiments, the first arc-shaped structure and the second arc-shaped structure are located on the same level, first ends of the two arc-shaped structures are rotationally connected by means of a hinge shaft, and second ends of the two arc-shaped structures are capable of being rotated to a state of abutting against each other.

In some embodiments, the second end of the first arc-shaped structure is provided with a stopping surface, the second end of the second arc-shaped structure is provided with a fitting surface, and when the fitting surface abuts against the stopping surface, the first arc-shaped structure and the second arc-shaped structure form the closed ring structure.

In some embodiments, the stopping surface is inclined, and when the first arc-shaped structure and the second arc-shaped structure are rotated to abut against each other, the fitting surface is fitted with the stopping surface.

In some embodiments, the magnetic adsorption fixing portion includes an extension rod, and one end of the rod body is hinged to an end portion of the extension rod.

In some embodiments, a storage groove is formed in the extension rod, and the rod body is capable of being rotated into the storage groove to be stored.

In some embodiments, the magnetic adsorption fixing portion includes an extension rod, and the top end of the three-legged support is hinged to an end portion of the extension rod.

In some embodiments, the three-legged support includes a connecting portion and a plurality of support legs, the connecting portion is hinged to the end portion of the extension rod, the plurality of support legs are hinged to the connecting portion and are capable of being opened and folded, a storage groove is formed in the extension rod, and the support legs are capable of being rotated into the storage groove to be stored after being folded.

In some embodiments, the magnetic adsorption fixing portion further includes a friction pad, and the friction pad is bonded to an adsorption side surface of at least one of the first arc-shaped structure and the second arc-shaped structure.

In some embodiments, an adsorption surface of at least one of the first arc-shaped structure and the second arc-shaped structure is provided with friction lines.

In some embodiments, the first elastic torsion member is a torsional spring, and two torsion arms of the torsional spring respectively abut against the first arc-shaped structure and the second arc-shaped structure.

Compared with the prior art, the above technical solutions provided by the embodiments of the present application have the following advantages: when the magnetic adsorption type support is used for supporting the electronic device, the support is adsorbed at the back of the portable electronic device, such as a mobile phone and a tablet computer, by means of the magnetic adsorption fixing portion, and then is turned by means of the overturning support portion in the direction away from the magnetic adsorption fixing portion, so that the overturning support portion and the magnetic adsorption fixing portion form a certain angle, the overturning support portion is fitted to a horizontal plane such as a desktop and cooperates with the magnetic adsorption fixing portion to support the electronic device, and the supporting angle for the electronic device is adjusted by adjusting the included angle between the overturning support portion and the magnetic adsorption fixing portion; and in a non-support state, the magnetic adsorption fixing portion can be separated from the electronic device, then the ring structure of the magnetic adsorption fixing portion that can be opened and closed is opened and worn on a strip-shaped structure, and then the ring structure is closed, so that the magnetic adsorption type support is worn and fixed, and losing of the magnetic adsorption type support in the non-support state is effectively prevented.

BRIEF DESCRIPTION OF DRAWINGS

Drawings herein are incorporated into the specification and constitute a portion of the specification, show embodiments conforming to the present application, and are used for explaining principles of the present application together with the specification.

In order to explain the embodiments of the present application or technical solutions in the prior art more clearly, drawings needed in descriptions of the embodiments or the prior art will be briefly introduced below. Obviously, for a person of ordinary skill in the art, other drawings can also be obtained according to these drawings without involving any inventive effort.

Figure 1:
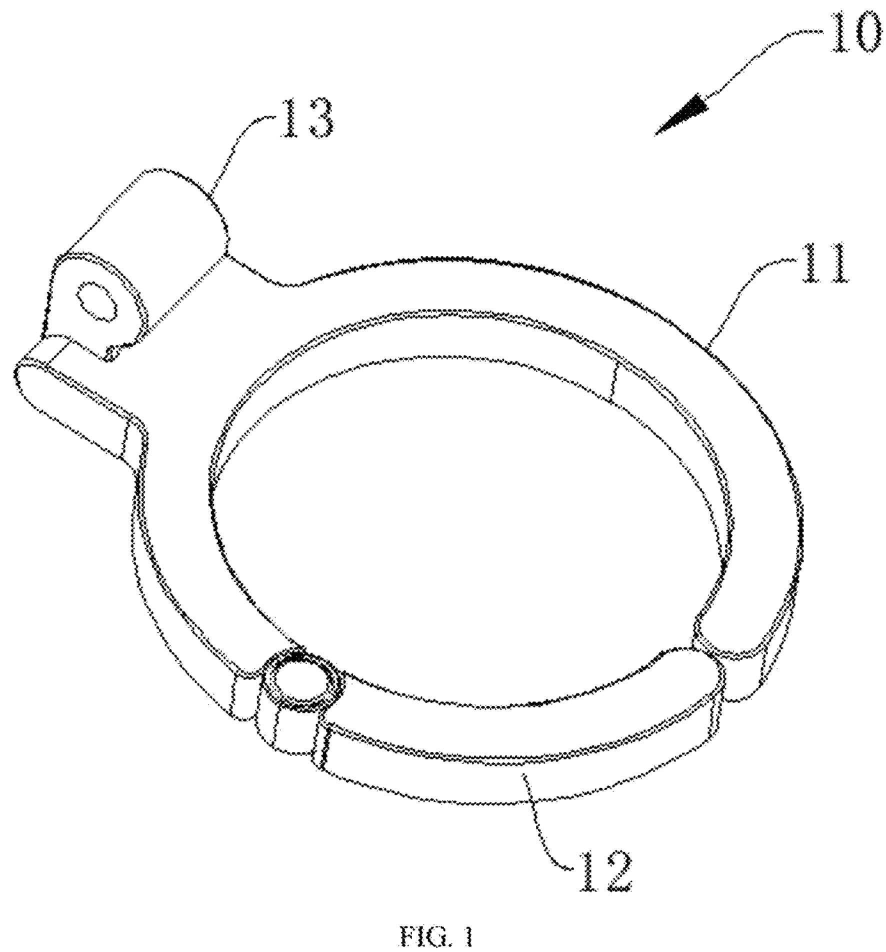

One or more embodiments are illustrated by means of the pictures in the corresponding drawings, and these illustrations do not constitute limitations on the embodiments. Elements with the same reference numeral signs in the drawings represent similar elements. Unless otherwise specified, pictures in the drawings do not constitute proportion limitations.

Figure 2:
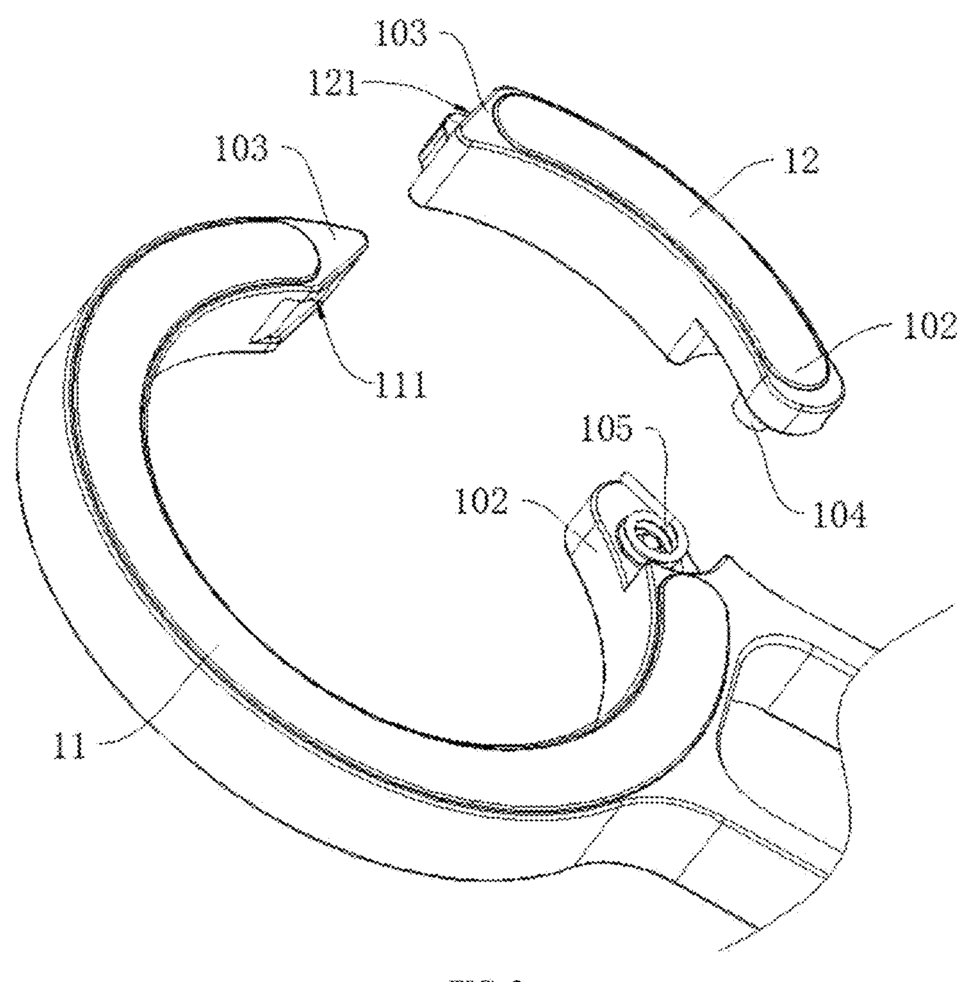
Figure 3:
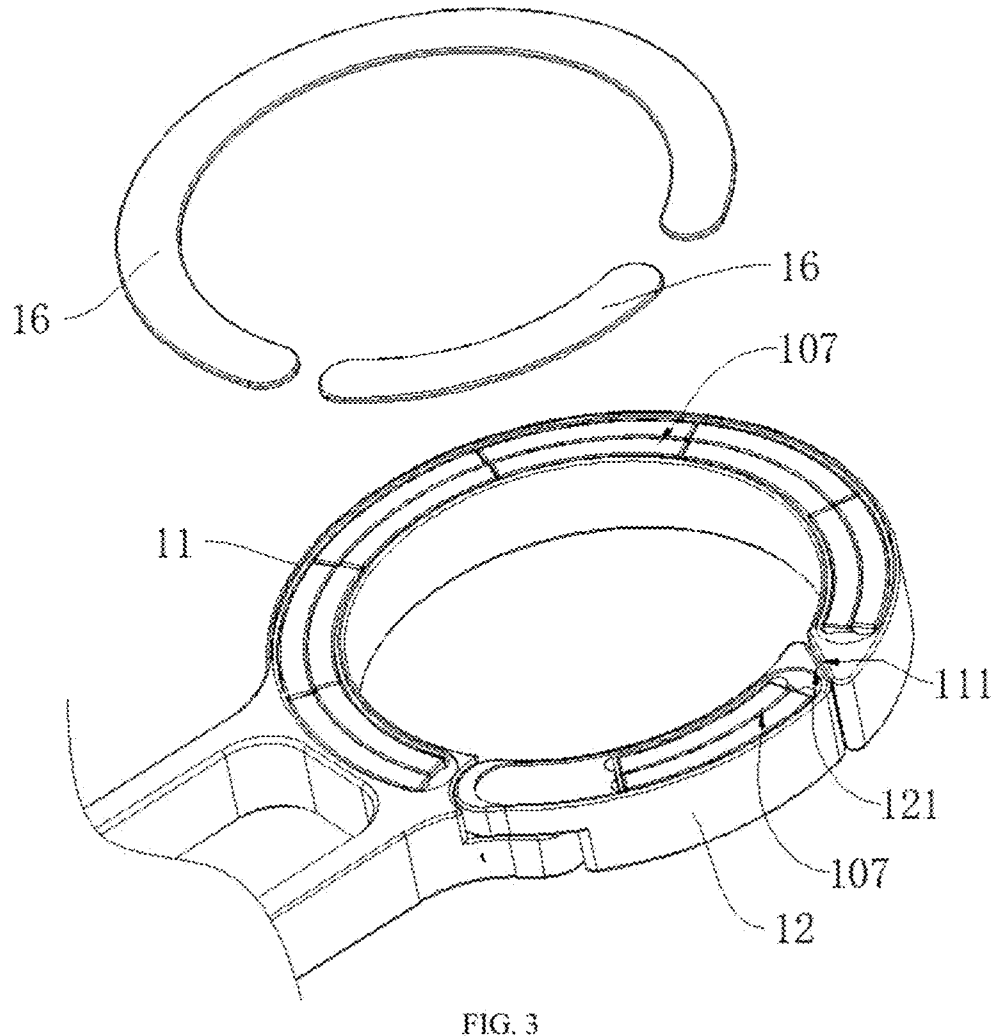
Figure 4:
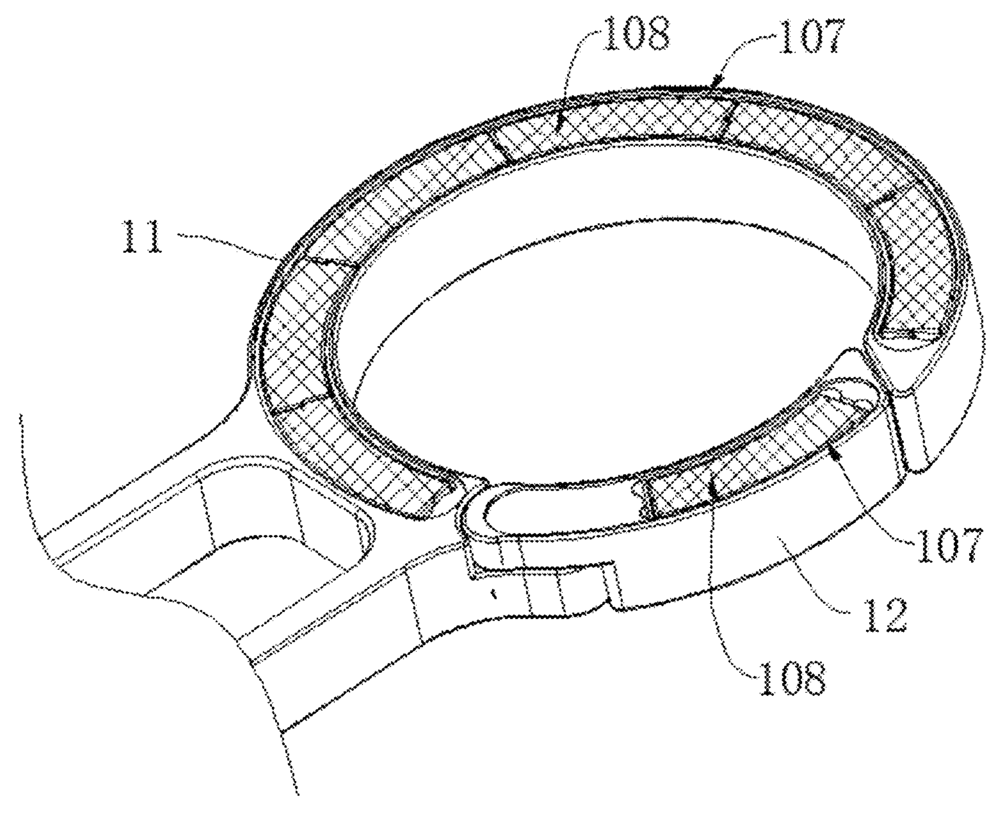
Figure 5:
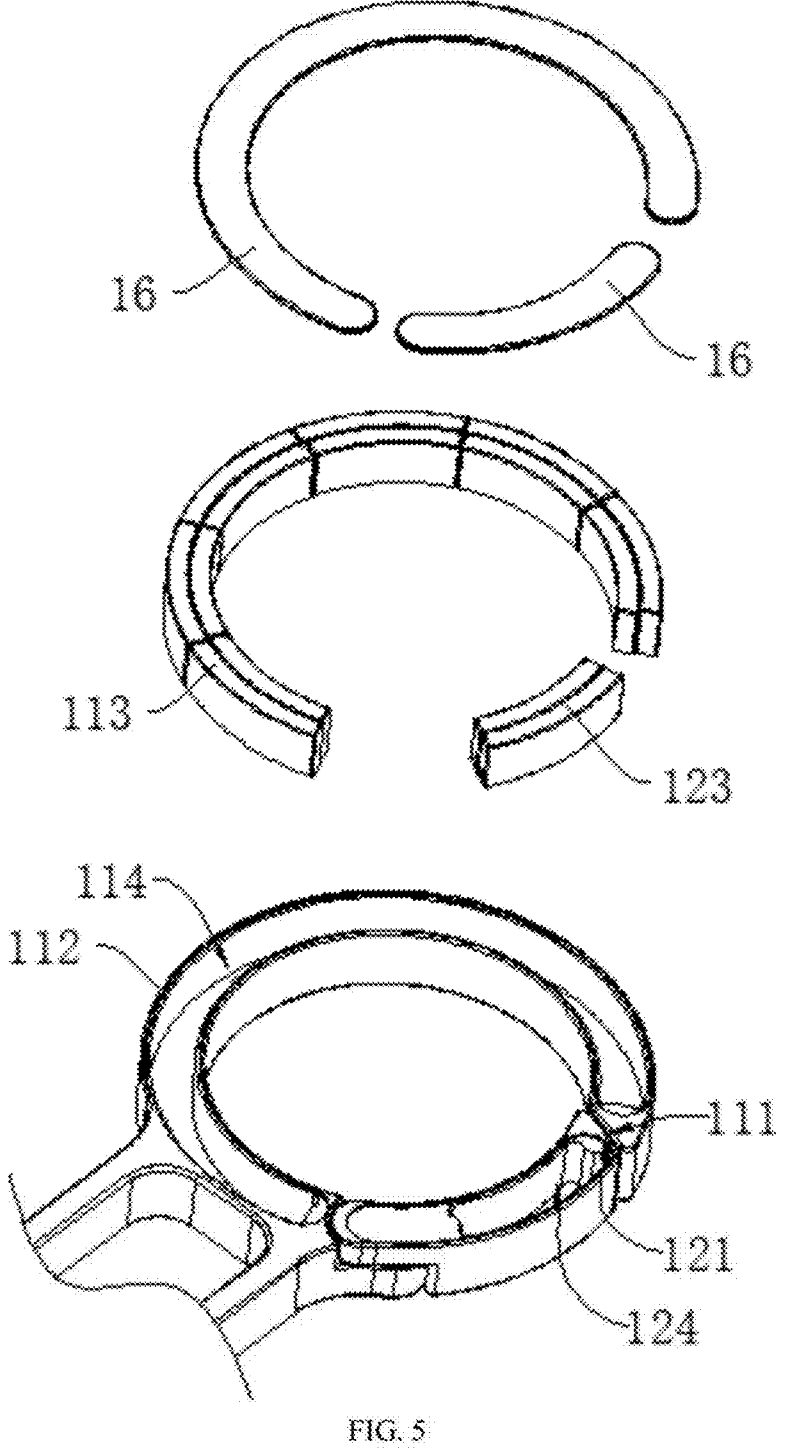
Figure 6:
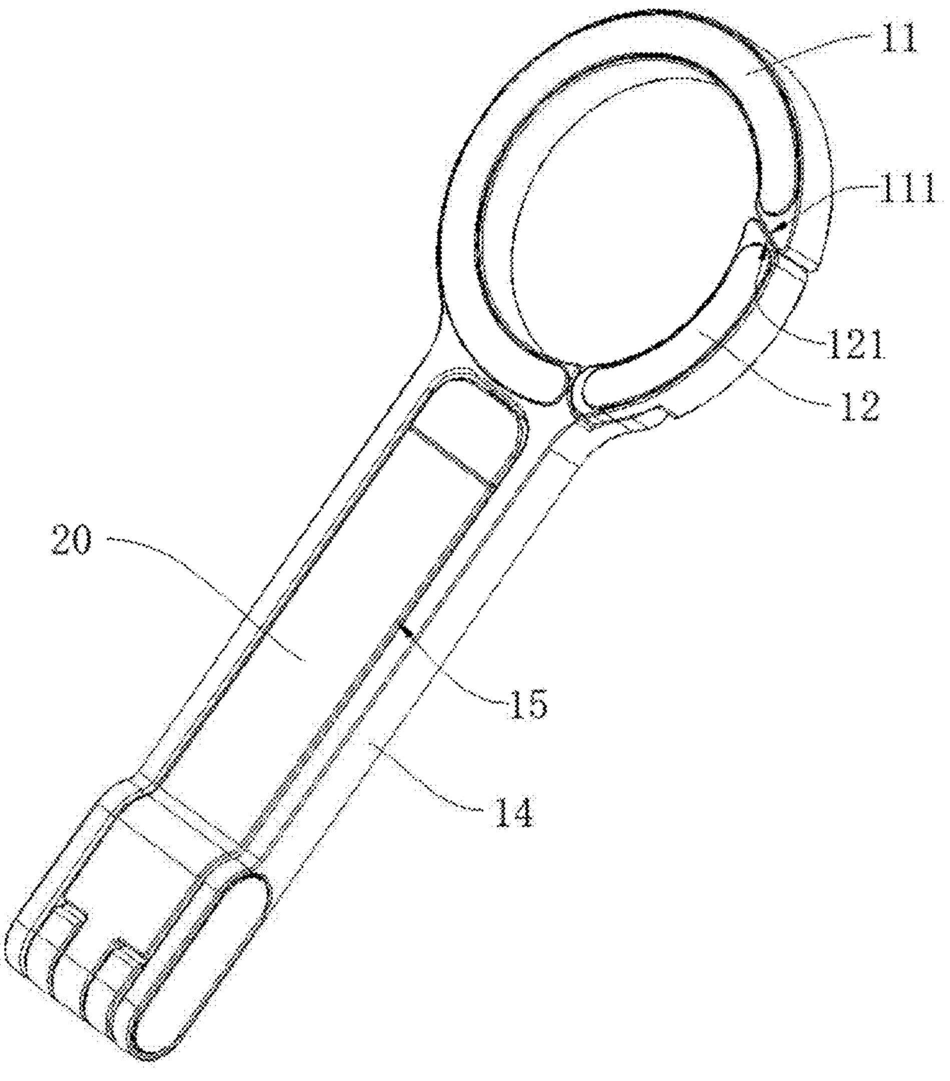
Figure 7:
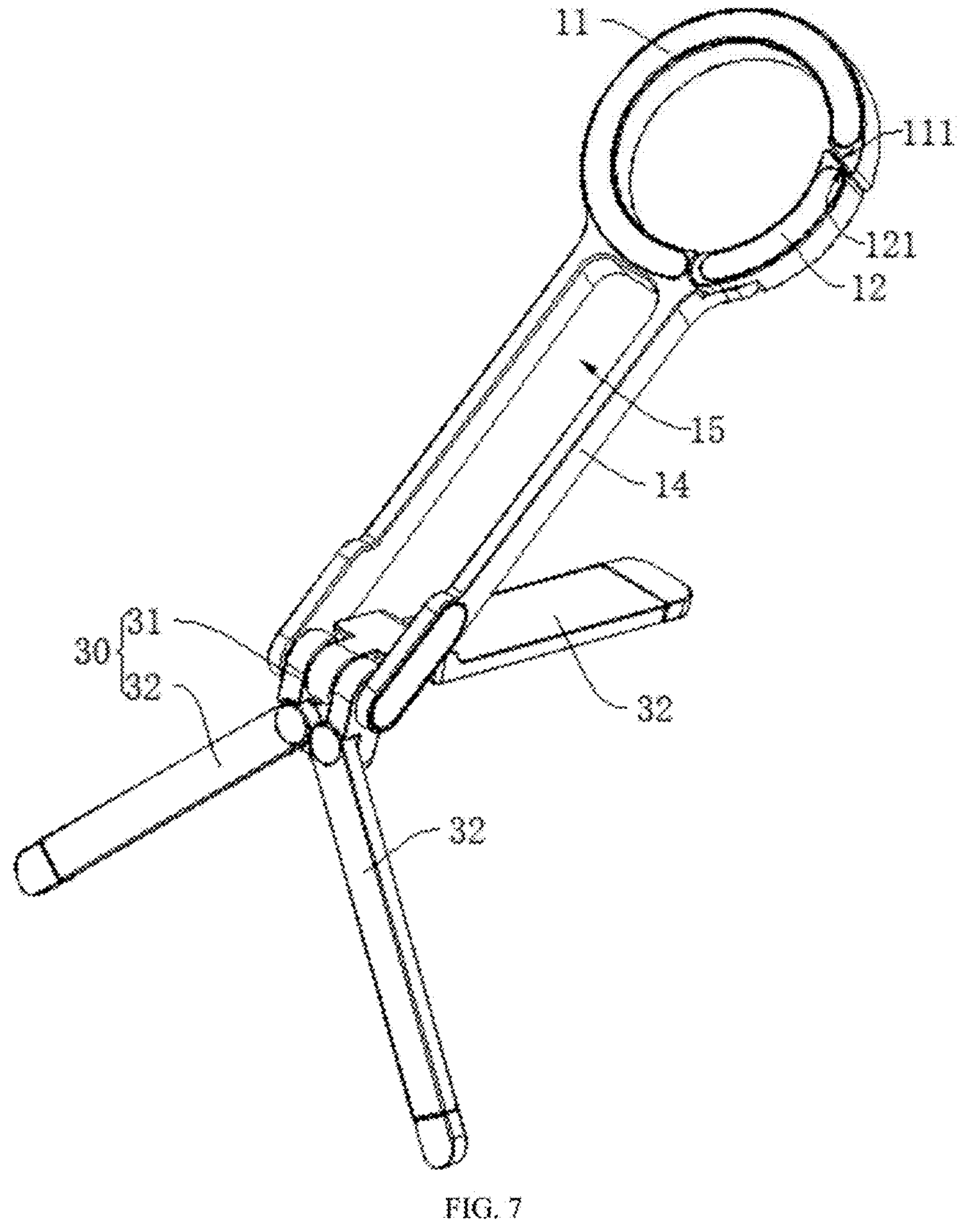
Figure 8:
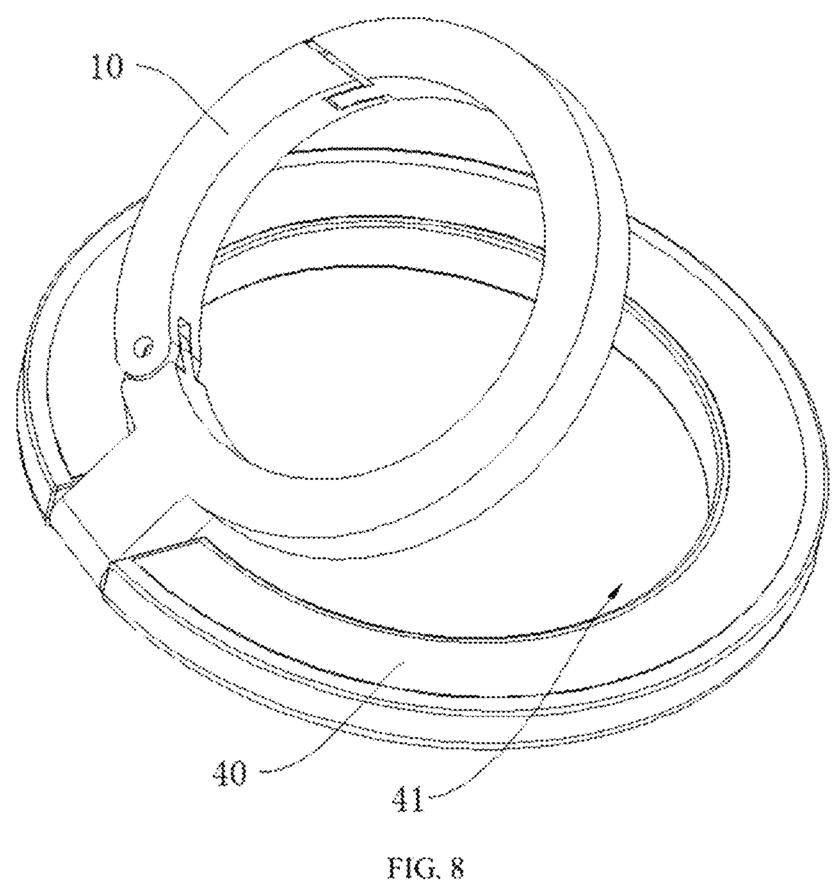
Figure 9:
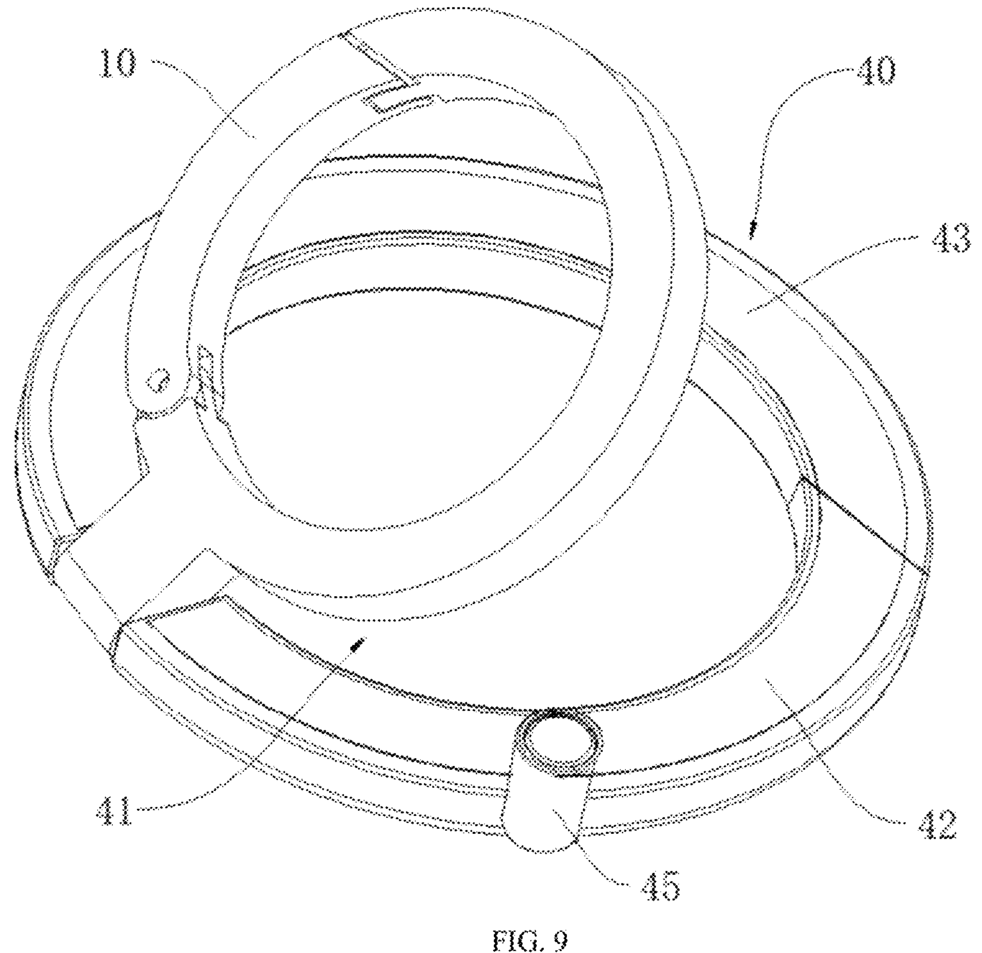
Figure 10:
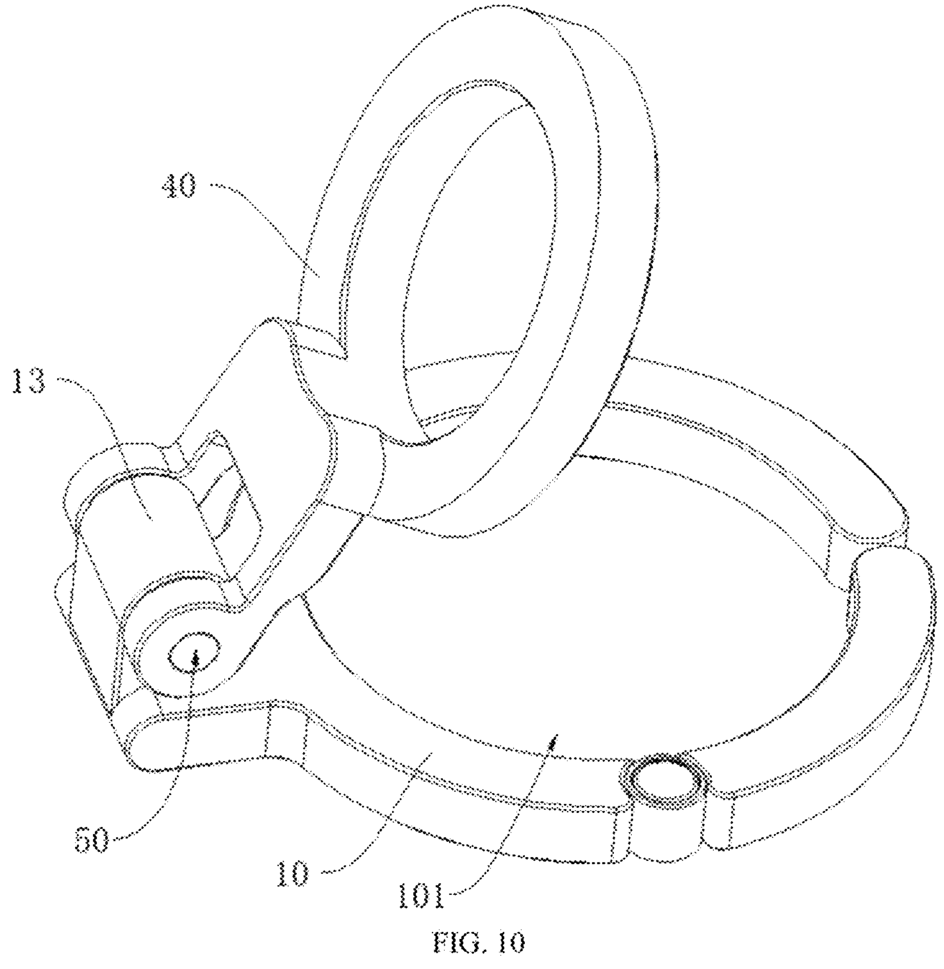

FIG. 1 is a local structural schematic diagram of a magnetic adsorption type support provided in an embodiment of the present application;

FIG. 2 is a local structural schematic diagram of a magnetic adsorption type support provided in an embodiment of the present application, which specifically shows the position of a torsional spring;

FIG. 3 is a local structural schematic diagram of a magnetic adsorption type support provided in an embodiment of the present application, which specifically shows the position of a friction pad;

FIG. 4 is a local structural schematic diagram of a magnetic adsorption type support provided in an embodiment of the present application, which specifically shows the position of friction lines;

FIG. 5 is a local structural exploded view of a magnetic adsorption type support provided in an embodiment of the present application;

FIG. 6 is an overall structural diagram of an implementation manner of a magnetic adsorption type support provided in an embodiment of the present application, which specifically shows the position of a rod body;

FIG. 7 is an overall structural diagram of an implementation manner of a magnetic adsorption type support provided in an embodiment of the present application, which specifically shows the position of a three-legged support;

FIG. 8 is an overall structural diagram of an implementation manner of a magnetic adsorption type support provided in an embodiment of the present application, where a magnetic adsorption fixing portion can be stored on an inner storage circumference;

FIG. 9 is an overall structural diagram of an implementation manner of a magnetic adsorption type support provided in an embodiment of the present application, which specifically shows a third arc-shaped structure and a fourth arc-shaped structure; and FIG. 10 is an overall structural diagram of an implementation manner of a magnetic adsorption type support provided in an embodiment of the present application, where a ring structure can be stored on an inner accommodating circumference.

DESCRIPTION OF REFERENCE NUMERALS

10. magnetic adsorption fixing portion; 101. inner accommodating circumference; 102. first end; 103. second end; 104. hinge shaft; 105. torsional spring; 106. friction line; 107. adsorption side surface; 11. first arc-shaped structure; 111. stopping surface; 112. first arc-shaped housing; 113. first magnet; 114. first recess; 12. second arc-shaped structure; 121. fitting surface; 122. second arc-shaped housing; 123. second magnet; 124. second recess; 13. connecting protrusion; 131. rotating shaft hole; 14. extension rod; 15. storage groove; 16. friction pad; 20. rod body; 30. three-legged support; 31. connecting portion; 32. support leg; 40. ring structure; 41. inner storage circumference; 42. third arc-shaped structure; 44. fourth arc-shaped structure; 45. hinging shaft; and 50. overturning shaft.

DETAILED DESCRIPTION OF THE EMBODIMENTS

In order to make the purposes, technical solutions and advantages of embodiments of the present application clearer, the technical solutions in the embodiments of the present application will be described clearly and completely below in combination with the accompanying drawings in the embodiments of the present application. Obviously, the described embodiments are only part of embodiments of the present application, not all of them. On the basis of the embodiments of the present application, all other embodiments obtained by those of ordinary skill in the art without involving any inventive effort should fall within the scope of protection of the present application.

The disclosure below provides a plurality of different embodiments or examples to achieve different structures of the present application. In order to simplify the application, components and arrangements of specific examples are described below. Of course, they are only examples, and are not intended to limit the present application. In addition, numbers and/or letters can be referred repeatedly in the different examples of the present application. Such repetitions are for the simple and clear purpose, and do not indicate the relationship between the discussed various embodiments and/or arrangements.

In order to facilitate description, spatial relative relationship terms can be used herein to describe the relative position relationship or movement condition of one element or feature as shown in the drawing relative to the other element or feature, and these relative relationship terms are, for example, “inside”, “outside”, “inner side”, “outer side”, “under”, “below”, “on”, “above”, “front”, “rear”, etc. Such spatial relative relationship terms means including different orientations of a device in use or operation in addition to the orientations described in the drawings. For example, if the device in the drawing is subjected to position overturning or posture change or movement state change, these directional indications also change correspondingly, for example, the element described as “under another element or feature” or “below another element or feature” is then oriented to be “on another element or feature” or “above another element or feature”. Therefore, the exemplary term “below” may include upper and lower orientations. The device can be oriented in other ways (rotated by 90 degrees or in other directions), which are correspondingly explained by the spatial relative relationship description signs used herein.

In order to solve the technical problem that a magnetic adsorption type support in a non-support state separated from an electronic device is easy to lose in the prior art, the present application provides a magnetic adsorption type support, which can stably and reliably support the electronic device in a support state connected to the electronic device, and can be worn and fixed in the non-support state separated from the electronic device, thereby effectively preventing losing of the magnetic adsorption type support.

Reference is made to FIG. 1. An embodiment of the present application provides a magnetic adsorption type support, including a magnetic adsorption fixing portion 10 and an overturning support portion, where at least one of the two portions is of a ring structure capable of being opened and closed. This drawing mainly explains the principle of the present application by taking the magnetic adsorption fixing portion 10 of the ring structure capable of being opened and closed as an example, so that the structure of the overturning support portion is not shown. It is understandable that it is also applicable under the condition that the overturning support portion is of the ring structure capable of being opened and closed or the two portions are both of the ring structures capable of being opened and closed.

The magnetic adsorption fixing portion 10 can be adsorbed and fixed to the back of a housing of the electronic device such as a mobile phone or a tablet computer, and the overturning support portion is hinged to the magnetic adsorption fixing portion 10, so that the overturning support portion can be overturned towards or away from the magnetic adsorption fixing portion 10. When the magnetic adsorption type support is fixedly connected to the electronic device by means of the magnetic adsorption fixing portion 10, the overturning support portion is rotated away from the magnetic adsorption fixing portion 10, so that the overturning support portion and the magnetic adsorption fixing portion 10 form a certain angle, for example, 90° and 75°, the electronic device is supported at this angle, and the overturning support portion usually can be flatly fitted to a horizontal plane such as a desktop. The overturning support portion is rotated relative to the magnetic adsorption fixing portion 10 to change the included angle between the two portions, thereby adjusting the supporting angle for the electronic device.

Moreover, when the magnetic adsorption type support is in a non-support state separated from the electronic device, the magnetic adsorption type support is small in size, in order to avoid losing, the ring structure of the magnetic adsorption fixing portion 10 or the overturning support portion that can be opened and closed can be opened and then worn on a strip-shaped or ring-shaped closed structure such as a strap, then the ring structure is closed, the magnetic adsorption type support is worn and fixed, and losing of the magnetic adsorption type support is effectively prevented. When the electronic device needs to be supported by the magnetic adsorption type support, the ring structure is opened again, and the magnetic adsorption type support is taken down.

Reference is made to FIG. 1 and FIG. 2. In some embodiments, the magnetic adsorption fixing portion 10 is of the ring structure, specifically, a circular ring structure. The magnetic adsorption fixing portion 10 includes a first arc-shaped structure 11 and a second arc-shaped structure 12, where the radian of the first arc-shaped structure 11 is usually greater than π. For example, the radian of the first arc-shaped structure 11 is 3/2π, and the radian of the second arc-shaped structure 12 is 1/2π, and the sum of the radian of the two arc-shaped structures is 2π. The first arc-shaped structure 11 and the second arc-shaped structure 12 are located on the same level, first ends 102 of the two arc-shaped structures are rotationally connected by means of a hinge shaft 104, and second ends 103 of the two arc-shaped structures are capable of being rotated to a state of abutting against each other. The first arc-shaped structure 11 and the second arc-shaped structure 12 being located on the same level specifically means that first side surfaces of the two arc-shaped structures are generally located on the same plane, second side surfaces of the two arc-shaped structures facing away from the first side surfaces are also generally located on the same plane, one of the first side surfaces and the second side surfaces is configured to be adsorbed and fitted to the back of the housing of the electronic device, and the adsorbed side surface is an adsorption surface.

The second end 103 of the first arc-shaped structure 11 is provided with a stopping surface 111, the second end 103 of the second arc-shaped structure 12 is provided with a fitting surface 121, and when the fitting surface 121 abuts against the stopping surface 111, the first arc-shaped structure 11 and the second arc-shaped structure 12 form the closed ring structure. In order to enable the first arc-shaped structure 11 and the second arc-shaped structure 12 to abut against each other without being separated from each other, the stopping surface 111 is inclined, and when the first arc-shaped structure 11 and the second arc-shaped structure 12 are rotated to abut against each other, the fitting surface 121 is fitted with the stopping surface 111 without a gap, so that the overall appearance of the closed ring structure is more attractive.

When the second ends 103 of the first arc-shaped structure 11 and the second arc-shaped structure 12 are in the state of being separated from each other, the magnetic adsorption fixing portion 10 can be worn on the strip-shaped or ring-shaped closed structure such as the strap, and then the first arc-shaped structure 11 and the second arc-shaped structure 12 are rotated relative to each other to form the closed ring structure, thereby wearing and fixing the magnetic adsorption type support.

At least one of the first arc-shaped structure 11 and the second arc-shaped structure 12 can be magnetically adsorbed and fixed to the back of the housing of the electronic device, that is, at least one of the first arc-shaped structure 11 and the second arc-shaped structure 12 is provided with a magnet. Preferably, both the first arc-shaped structure 11 and the second arc-shaped structure 12 can be provided with the magnets, thereby improving the connection reliability between the magnetic adsorption type support and the electronic device.

In other embodiments, the magnetic adsorption fixing portion 10 can also be of an irregular circular ring structure, for example, the magnetic adsorption fixing portion 10 can be of an elliptical ring structure or other irregular ring structures. The radian of the first arc-shaped structure 11 is also not limited to $3/2\pi$ in the above embodiment, the radian of the second arc-shaped structure 12 is not limited to $1/2\pi$ in the above embodiment, the radian or length of the first arc-shaped structure 11 and the second arc-shaped structure 12 can be adaptively adjusted according to requirements, and it is applicable to the present application when the first ends 102 of the two arc-shaped structures are rotationally connected and the second ends 103 can be rotated to the abutting state and form the closed ring structure.

Reference is made to FIG. 3 and FIG. 5. In some embodiments, the first arc-shaped structure 11 is provided with the magnet. Specifically, the first arc-shaped structure 11 includes a first arc-shaped housing 112 and a first magnet 113, the first arc-shaped housing 112 is provided with a first recess 114, and the first magnet 113 is embedded and fixed in the first recess 114 of the first arc-shaped housing 112. For example, the first recess 114 can be an arc-shaped recess extending in the same direction as the first arc-shaped structure 11, and the first magnet 113 is an arc-shaped magnet matching with the arc-shaped recess in shape. The first recesses 114 can also be rectangular recesses formed at intervals in an extending direction of the first arc-shaped housing 112, and the number of the first magnets 113 is correspondingly equal to the number of the first recesses 114/rectangular recesses. In order to improve the fixing reliability of the first magnet 113, after the first magnet 113 is embedded in the first recess 114, an assembly gap can also be coated with glue. Or an inner wall of the first recess 114 is coated with the glue in advance, and then the first magnet 113 is embedded and fixed in the first recess 114.

Further, the second arc-shaped structure 12 includes a second arc-shaped housing 122 and a second magnet 123, the second arc-shaped housing 122 is provided with a second recess 124, and the second magnet 123 can be embedded and fixed in the second recess 124 to be fixed relative to the second arc-shaped housing 122. The arrangement and assembly fixing manners of the second recess 124 and the second magnet 123 can refer to those of the first recess 114 and the first magnet 113, which are not repeated here.

In some embodiments, the stability of the ring structure formed after the second ends 103 of the first arc-shaped structure 11 and the second arc-shaped structure 12 abut against each other is improved, thereby preventing falling of the magnetic adsorption type support in a worn state due to separation of the second ends 103 of the first arc-shaped structure 11 and the second arc-shaped structure 12. The first ends 102 of the first arc-shaped structure 11 and the second arc-shaped structure 12 of the magnetic adsorption type support provided in the embodiment of the present application are connected in a damped rotating manner, that is, the first arc-shaped structure 11 and the second arc-shaped structure 12 are rotated relative to each other only when the torque is greater than the set torque, thereby opening the ring structure.

Reference is made to FIG. 2. In addition, the position of the hinge shaft 104 where the first arc-shaped structure 11 and the second arc-shaped structure 12 are rotationally connected can further be provided with a first elastic torsion member, the first elastic torsion member can be a torsional spring 105, and two torsion arms of the torsional spring 105 respectively abut against the first arc-shaped structure 11 and the second arc-shaped structure 12. The torsional spring 105 is configured to drive the second ends 103 of the first arc-shaped structure 11 and the second arc-shaped structure 12 to rotate close to each other, thereby keeping the second ends 103 of the two arc-shaped structures in the state of abutting against each other.

The overturning support portion of the magnetic adsorption type support provided in the embodiment of the present application can also be of the ring structure 40 capable of being opened and closed, that is, the magnetic adsorption type support can be worn and fixed by means of the magnetic adsorption fixing portion 10, and can also be worn and fixed by means of the overturning support portion.

Reference is made to FIG. 9. For example, the overturning support portion includes a third arc-shaped structure 42 and a fourth arc-shaped structure 43, one end of the third arc-shaped structure 42 and one end of the fourth arc-shaped structure 43 are rotationally connected, and the other end of the third arc-shaped structure 42 and the other end of the fourth arc-shaped structure 43 can be rotated to a state of abutting against each other; and when the other ends of the two arc-shaped structures are in the state of abutting against each other, the third arc-shaped structure 42 and the fourth arc-shaped structure 43 are matched to form the closed ring structure 40, thereby achieving wearing and fixing by means of the overturning support portion.

One end of the third arc-shaped structure 42 and one end of the fourth arc-shaped structure 43 are connected in a damped rotating manner, thereby improving the stability of the closed ring structure formed when the other ends of the two arc-shaped structures abut against each other. In addition, the position of a hinging shaft 45 where the third arc-shaped structure 42 and the fourth arc-shaped structure 43 are rotationally connected can further be provided with a second elastic torsion member, the second elastic torsion member can also be a torsional spring 105, and two torsion arms of the torsional spring 105 respectively abut against the third arc-shaped structure 42 and the fourth arc-shaped structure 43. The torsional spring 105 is configured to drive the other ends of the third arc-shaped structure 42 and the fourth arc-shaped structure 43 to rotate close to each other, thereby keeping the other ends of the two arc-shaped structures in the state of abutting against each other.

In addition, reference is made to FIG. 6. The overturning support portion can also be a rod body 20 convenient to hold, and one end of the rod body 20 is hinged to the magnetic adsorption fixing portion 10. Specifically, the magnetic adsorption fixing portion 10 includes an extension rod 14, and the extension rod 14 is fixed to an outer edge of the first arc-shaped structure 11. One end of the rod body 20 is hinge to an end portion of the extension rod 14. In order to facilitate storage of the magnetic adsorption type support, a storage groove 15 is formed in the extension rod 14, and the rod body 20 can be rotated into the storage groove 15 to be stored. When the support needs to be used, the rod body 20 can be rotated out of the storage groove 15 to be held by hand.

Reference is made to FIG. 7. The overturning support portion can also be a three-legged support 30, and the top end of the three-legged support 30 is hinged to the magnetic adsorption fixing portion 10. Specifically, the magnetic adsorption fixing portion 10 includes the extension rod 14, and the top end of the three-legged support 30 is hinged to an end portion of the extension rod 14. The three-legged support 30 includes a connecting portion 31 and a plurality of support legs 32, the connecting portion 31 is hinged to the end portion of the extension rod 14, and the plurality of support legs 32 are hinged to the connecting portion 31 and can be opened and folded. In order to facilitate storage of the magnetic adsorption type support, the storage groove 15 is formed in the extension rod 14, and the folded support legs 32 can be rotated into the storage groove 15 to be stored.

When the magnetic adsorption fixing portion 10 is adsorbed and fixed to the electronic device such as the mobile phone, the electronic device such as the mobile phone is supported by means of holding the rod body 20 or the three-legged support 30.

Reference is continuously made to FIG. 1 and FIG. 10. A connecting protrusion 13 protrudes from one side of the magnetic adsorption fixing portion 10 facing away from an adsorption side surface 107 thereof, a rotating shaft hole 131 is formed in the connecting protrusion 13, and the overturning support portion is connected/hinged in an overturning manner to the magnetic adsorption fixing portion 10 by means of an overturning shaft 50 and the rotating shaft hole 131. The rotating shaft holes 131 can be formed on two sides of the connecting protrusion 13 and can also penetrate through the connecting protrusion 13, and the overturning shaft 50 is adapted to the rotating shaft hole 131. The above-mentioned adsorption side surface 107 of the magnetic adsorption fixing portion 10 specifically means a side surface of the magnetic adsorption fixing portion 10 that is configured to be fitted and adsorbed on the housing of the electronic device.

Reference is made to FIG. 8. In some embodiments, in order to reduce the size of the folded magnetic adsorption type support, the overturning support portion can be configured to be of the ring structure 40 capable of being opened and closed, a connecting end of the ring structure 40 with the magnetic adsorption fixing portion 10 is arranged on an inner storage circumference 41 of the ring structure 40, and meanwhile, the size of the magnetic adsorption fixing portion 10 is set to be less than that of a hollow portion of the inner storage circumference 41 of the ring structure 40, so that the magnetic adsorption fixing portion 10 can be overturned and stored on the inner storage circumference 41 of the ring structure 40.

Reference is made to FIG. 10. The magnetic adsorption fixing portion 10 is configured to be of the ring structure capable of being opened and closed, a connecting end of the overturning support portion with the magnetic adsorption fixing portion 10 is arranged on an inner accommodating circumference 101 of the magnetic adsorption fixing portion 10, and meanwhile, the size of the overturning support portion is set to be less than that of a hollow portion of the inner accommodating circumference 101 of the magnetic adsorption fixing portion 10, so that the overturning support portion can be overturned and accommodated on the inner accommodating circumference 101 of the magnetic adsorption fixing portion 10. The overturning support portion can be of the ring structure 40, and the size of the ring structure 40 is set to be less than that of the hollow portion of the inner accommodating circumference 101 of the magnetic adsorption fixing portion 10, so that the ring structure 40 can be overturned and accommodated on the inner accommodating circumference 101 of the magnetic adsorption fixing portion 10.

Reference is made to FIG. 3 and FIG. 4. In some embodiments, in order to improve the connection stability of the magnetic adsorption type support and the electronic device, an adsorption surface of at least one of the first arc-shaped structure 11 and the second arc-shaped structure 12 is provided with friction lines 106, thereby preventing the slipping at the joint of the magnetic adsorption type support and the electronic device.

Or the magnetic adsorption fixing portion 10 further includes a friction pad 16, and the friction pad 16 is bonded to the adsorption surface of at least one of the first arc-shaped structure 11 and the second arc-shaped structure 12, thereby preventing the slipping at the joint of the magnetic adsorption type support and the electronic device.

It should be understood that the terms used herein are only for the purpose of describing the specific exemplary implementation manners, and are not intended for limitations. Unless otherwise explicitly pointed out in the context, singular forms such as "a", "one" and "the" used herein may also indicate including plural forms. The terms "comprising", "including", "containing" and "having" are inclusive, and therefore indicate the existence of the stated features, steps, operations, elements and/or parts, but do not exclude the existence or addition of one or more other features, steps, operations, elements, parts and/or combinations thereof. Unless the execution sequence is explicitly stated, the steps, processes and operations of methods described herein are not explained in such a manner that they must be executed in the specific sequence described or explained. It should also be understood that other or alternative steps can be used.

Although the terms such as first, second and third can be used herein to describe multiple elements, parts, regions, layers and/or sections, these elements, parts, regions, layers and/or sections should not be limited by these terms. These terms can be used for distinguishing one element, part, region, layer or section from the other region, layer or section only. Unless explicitly pointed out in the context, the terms such as "first" and "second" and other numerical terms do not imply the sequence or order when used herein. Therefore, the first element, part, region, layer or section discussed below can also be called second element, part, region, layer or section without departing from the teachings of the exemplary implementation manners.

The above are only specific implementation manners of the present application, which enable a person skilled in the art to understand or implement the present application. Various modifications on these embodiments would have been obvious to a person skilled in the art. General principles defined herein can be implemented in other embodiments without departing from the spirit or scope of the present application. Therefore, the present application will not be limited to these embodiments as shown herein, and should conform to the widest scope consistent with the principles and new characteristics herein.

What is claimed is:

1. A magnetic adsorption type support, comprising:

a magnetic adsorption fixing portion configured to be magnetically adsorbed on an electronic device; and an overturning support portion which is hinged to the magnetic adsorption fixing portion and is capable of being overturned towards or away from the magnetic adsorption fixing portion, wherein the overturning support portion cooperates with the magnetic adsorption fixing portion to support the electronic device when being overturned away from the magnetic adsorption fixing portion; and the magnetic adsorption fixing portion is of a ring structure capable of being opened and closed.

2. The magnetic adsorption type support according to claim 1, wherein the magnetic adsorption fixing portion is of the ring structure; and the magnetic adsorption fixing portion comprises:

a first arc-shaped structure; and a second arc-shaped structure rotationally connected to the first arc-shaped structure, wherein the first arc-shaped structure and the second arc-shaped structure form the closed ring structure when being rotated to abut against each other; and at least one of the first arc-shaped structure and the second arc-shaped structure is capable of being magnetically adsorbed on the electronic device.

3. The magnetic adsorption type support according to claim 2, wherein the radian of the first arc-shaped structure is greater than x; and the first arc-shaped structure comprises a first arc-shaped housing and a first magnet, and the first arc-shaped housing is provided with a first recess for accommodating and fixing the first magnet.

4. The magnetic adsorption type support according to claim 2, wherein the second arc-shaped structure comprises a second arc-shaped housing and a second magnet, and the second arc-shaped housing is provided with a second recess for accommodating and fixing the second magnet.

5. The magnetic adsorption type support according to claim 2, wherein the first arc-shaped structure and the second arc-shaped structure are connected in a damped rotating manner, or a first elastic torsion member for driving the first arc-shaped structure and the second arc-shaped structure to rotationally abut against each other is disposed at a rotational connection position of the first arc-shaped structure and the second arc-shaped structure.

6. The magnetic adsorption type support according to claim 5, wherein the first elastic torsion member is a torsional spring, and two torsion arms of the torsional spring respectively abut against the first arc-shaped structure and the second arc-shaped structure.

7. The magnetic adsorption type support according to claim 2, wherein the first arc-shaped structure and the second arc-shaped structure are located on the same level, first ends of the two arc-shaped structures are rotationally connected by means of a hinge shaft, and second ends of the two arc-shaped structures are capable of being rotated to a state of abutting against each other.

8. The magnetic adsorption type support according to claim 7, wherein the second end of the first arc-shaped structure is provided with a stopping surface, the second end of the second arc-shaped structure is provided with a fitting surface, and when the fitting surface abuts against the stopping surface, the first arc-shaped structure and the second arc-shaped structure form the closed ring structure.

9. The magnetic adsorption type support according to claim 8, wherein the stopping surface is inclined, and when the first arc-shaped structure and the second arc-shaped structure are rotated to abut against each other, the fitting surface is fitted with the stopping surface.

10. The magnetic adsorption type support according to claim 2, wherein the magnetic adsorption fixing portion further comprises a friction pad, and the friction pad is bonded to an adsorption side surface of at least one of the first arc-shaped structure and the second arc-shaped structure.

11. The magnetic adsorption type support according to claim 2, wherein an adsorption surface of at least one of the first arc-shaped structure and the second arc-shaped structure is provided with friction lines.

12. The magnetic adsorption type support according to claim 1, wherein the overturning support portion is a rod body convenient to hold, and one end of the rod body is hinged to the magnetic adsorption fixing portion.

13. The magnetic adsorption type support according to claim 12, wherein the magnetic adsorption fixing portion comprises an extension rod, and one end of the rod body is hinged to an end portion of the extension rod.

14. The magnetic adsorption type support according to claim 13, wherein a storage groove is formed in the extension rod, and the rod body is capable of being rotated into the storage groove to be stored.

15. The magnetic adsorption type support according to claim 1, wherein the overturning support portion is a three-legged support, and a top end of the three-legged support is hinged to the magnetic adsorption fixing portion.

16. The magnetic adsorption type support according to claim 15, wherein the magnetic adsorption fixing portion comprises an extension rod, and the top end of the three-legged support is hinged to an end portion of the extension rod.

17. The magnetic adsorption type support according to claim 16, wherein the three-legged support comprises a connecting portion and a plurality of support legs, the connecting portion is hinged to the end portion of the extension rod, the plurality of support legs are hinged to the connecting portion and are capable of being opened and folded, a storage groove is formed in the extension rod, and the support legs are capable of being rotated into the storage groove to be stored after being folded.

18. The magnetic adsorption type support according to claim 1, wherein a connecting protrusion protrudes from one side of the magnetic adsorption fixing portion facing away from an adsorption side surface thereof, a rotating shaft hole is formed in the connecting protrusion, and the overturning support portion is provided with an overturning shaft adapted to the rotating shaft hole.

19. The magnetic adsorption type support according to claim 1, wherein the overturning support portion is of a ring structure capable of being opened and closed, and the magnetic adsorption fixing portion is overturned and folded on an inner storage circumference of the ring structure.

20. The magnetic adsorption type support according to claim 1, wherein the magnetic adsorption fixing portion is of the ring structure capable of being opened and closed, and the overturning support portion is overturned and folded on an inner accommodating circumference of the magnetic adsorption fixing portion.

* * * * *